Oct. 1, 1929.   A. C. FISCHER   1,730,000
COMPOSITION OF MATTER
Filed Jan. 25, 1926
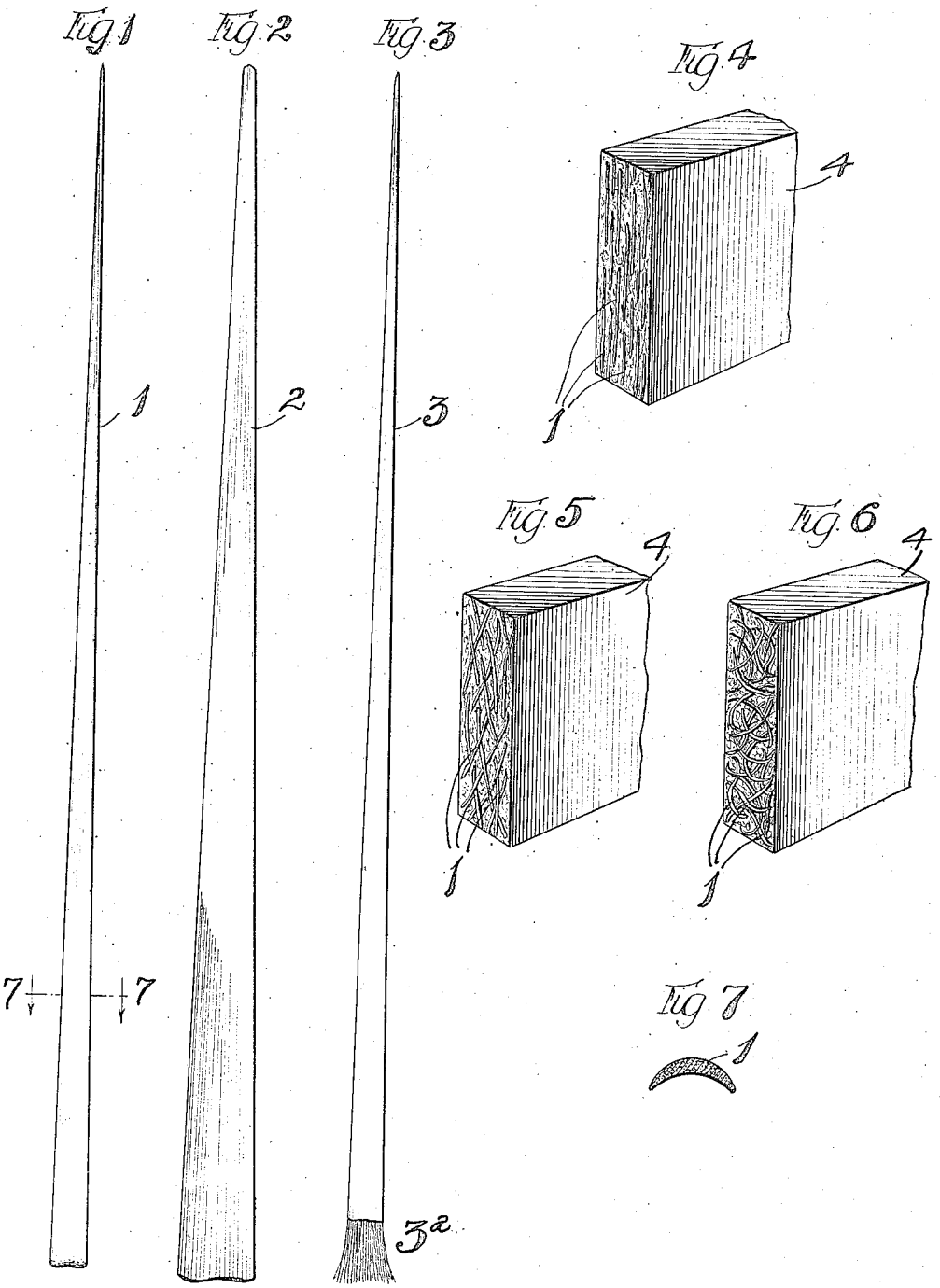
Inventor.
Albert C. Fischer, Patented Oct. 1, 1929

1,730,000

UNITED STATES PATENT OFFICE

ALBERT C. FISCHER, OF CHICAGO, ILLINOIS, ASSIGNOR TO THE PHILIP CAREY MANUFACTURING COMPANY, A CORPORATION OF OHIO

COMPOSITION OF MATTER

Application filed January 25, 1926. Serial No. 83,558.

My present invention relates in general to mastic or the like materials or compositions for use primarily in masonry and concrete constructions, such as, roadways, pavements, walls, floors, and in any other structure where the effects of expansion and contraction and other existing conditions of a destructive nature are to be accounted for.

The composition of the material may also be advantageously used for floor coverings, insulating purposes, packings, and in fact in any place that the specifications may call for a material of this class.

While the above explains the general uses to which the composition may be put, and without confining the scope of the invention to any special use, I have elected to describe the salient features of the composition in connection with roadways constructed of concrete, bricks, paving blocks and the like, and with which it is adapted to be used as either a poured or preformed joint between sections or between the curbing and the roadway, to provide a strip having the inherent qualities of a compressible waterproofing filler. These joints are known to the trade as expansion joints, and I have discovered that the best results can be obtained by using a compressible binding material with a filling material incorporated therewith in proportions to derive a comparatively solid yet resilient mastic composition. In this particular case I have adopted the use of a fibrous vegetable growth as a filling medium, consisting of relatively long blades having closely matted fibres extending continuously the length of the blade, and pliable and tough in structure.

The use of a fibrous material of this nature adds many desirable qualities to the finished product, and it so happens that in the present instance the material which I prefer to use is available in large quantities at an attractive cost price, and in localities where other materials that could be used as a substitute are not available on a competing basis.

As a preferred material I have selected that species of plant specified as *Yucca glauca*, or other species of Yucca or even species of Nolina. I have selected *Yucca glauca* as the preferred material since this particular species is available in the desired quantities, whereas the species of Nolina and other species of Yucca are not as commonplace. If they are available, however, they will serve the purpose just as well.

*Yucca glauca* is commonly called soapweed or bear grass, and in this connection I might state that these names are common names of several species of plants which technically are not of the Yucca species, but so far as the present invention is concerned all plants coming under these ordinary classifications are suitable for my particular use. I have simply selected *Yucca glauca* in that the blades grow directly from the root, in rosette fashion, and do not have a trunk or stem, so that in preparing the material for use it is not necessary to strip the same from the trunk, as would be the case in other species of Yucca.

The *Yucca glauca* blades, or leaves as they may be called, are usually about two feet long and one quarter inch wide. The texture on the outside is smooth, filaments on the margin and very tough and pointed on the end. All of these characteristics make the use of this plant highly desirable for realizing a strong resilient filler for the purpose described, and owing to the smooth film or skin on the surface only a small degree of precaution, if any, is required to exclude penetration of the binding material with which the filler is incorporated.

In this connection I might add that ordinarily I would prefer to incorporate the filling medium in the binding material in an unpenetrated state, so as not to destroy the natural supple and resilient qualities of the material.

To more clearly explain the advantages of this class of filling material I will refer to the illustration in the accompanying drawing, in which Fig. 1 is a view in elevation of a blade or leaf of the *Yucca glauca*. Fig. 2 is a similar view of a blade flattened out. Fig. 3 is a similar view with the end shredded to show the formation of the fibres. Fig. 4 is a perspective view of the end portion of an expansion joint, showing the formation of the incorporated blades in a compressible binder, preferably blown bituminous material. Fig. 5 is a view the same as Fig. 4, but showing the interlocking formation for the filling medium. Fig. 6 is a similar view showing a matted or tangled formation for the filling medium. Fig. 7 is a cross section on the line 7—7 of Fig. 1, showing the natural curvature of the blade before it is rolled out.

In reducing the invention to practice I would ordinarily proceed by rolling out the curved blades —1— so as to flatten them as shown at —2—. This is not all together important in every instance, in fact it may not even be desirable sometimes. I simply mention the fact as a possibility.

Should it so happen that the blades stand a long time after being cut it would be possible to restore them to their naturally pliable condition by saturation with a suitable solution, water or oil as an example. If this step were taken I would much prefer to accomplish the same in a manner that would leave the cellular structure unfilled by the solution. This would only be necessary to avoid brittleness, and the condition of the blades when they are to be used will determine whether this step is necessary. Should it be necessary to revivify the blades, as stated, a volatile should be generally employed so that the solution will be driven out during the mixing stage with the compressible binder, which will ordinarily be applied as a hot bituminous material, or else the treatment should be otherwise conducted to avoid undue saturation in the final stage, such for instance as rolling the blades between rollers. This would also accomplish the flattening measure as previously referred to.

The blade —3— as shown in Fig. 3 has been shredded, as at 3ª, to show the condition of the closely matted fibres. Each of these fibres extends the length of the blade, or substantially so. The outside skin or surface of the blades is smooth and resists penetration, which will help the situation in that the binding material will not readily penetrate the filler, and for this reason it will not ordinarily be necessary to treat the blades to prevent this penetration before mixing, unless they must be limbered up. It is, of course, understood that the saturation with the volatile as above mentioned, is not defeated by the outside skin of the blade, as it can simply be left in the solution until the desired penetration is accomplished.

The blades are incorporated in a binder, such as, bituminous material, usually blown asphalt, the asphalt being heated and in a state of desired plasticity at the time the blades are incorporated or mixed. The product may be turned out in sheet form, or as shown in Figs. 4 to 6, as a strip —4— in which form it would be used for expansion joint.

After the blades have been properly mixed with the binding material the mixture is introduced to rollers, or otherwise formed into sheets or strips, or else first into sheets and then cut into strips, and in passing thru the rollers the blades, providing the rollers are properly set, may be ironed out, so to speak, so as to lie in the direction of the feed thru the rollers. This would leave a segregated and laminated formation of the blades, as shown in Fig. 4, or even overlapping formation, shown in Fig. 5. In cases where the mixed material is forced through the rollers by pressure the blades would be tangled and more of less matted, as shown in Fig. 6. This would also depend a great deal upon the amount of blades used with a given amount of binding material. The proportions are rather important, especially in the case of paving joints, since they must meet standard specifications, and for this reason my experience has taught me that about fifteen per cent by weight of the blades and eighty-five per cent binding material is most acceptable. Of course, I do not confine myself to these proportions, but in any event, I will say that the maximum percentage of these blades should never exceed thirty-five per cent by weight to sixty-five per cent binding material. This percentage refers particularly to an expansion joint, and of course, is not controlling as far as concerns insulations, wall coverings etc., which the composition may be adaptable for.

The illustration of the drawing shows what is commonly known as a preformed expansion joint. Of course, I have in mind also the idea of using this composition as a filling material for pouring joints in the spaces between two sections of a roadway, or for filling cracks, or for sale in cans, and later molded or poured, or otherwise formed into sheets or strips.

Since I desire to take advantage of the reinforcing or strengthening qualities of the elongated fibrous characteristics of these blades I will use them in as long lengths as possible. I will not chop or cut them up unless some special occasion makes it necessary. When I speak of using the blades without cutting I, of course, realize that in handling and mixing the blades may be mutilated to a certain extent, but this will be to such a small degree that it will be of minor importance.

In some cases I may desire to use these blades as a primary filling medium in combination with a secondary filling medium, consisting of such materials as are already known to the art. However, in any event the resultant product will comprise a mastic, or material having like characteristic qualities, having incorporated therewith a filling medium capable of strengthening or reinforcing the composition without destroying the compressible or resilient features of the composition, and at the same time adding bulk without increasing the weight of the product to an undesirable degree.

I claim:

1. A paving joint, constructed of a single compressible layer of bituminous material of sufficient thickness to form a complete joint and having homogeneously incorporated therein the grass-like blades of a species of Yucca plant.

2. A paving joint, constructed of a single compressible layer of bituminous material of sufficient thickness to form a complete joint and having homogeneously incorporated therein grass-like blades of the *Yucca glauca* plant.

3. A paving joint, constructed of a single compressible layer of bituminous material of sufficient thickness to form a complete joint and having homogeneously incorporated therein relatively long and strong vegetable blades having smooth skins covering closely matted fibers extending the length of the blades and in parallel relation.

4. Constructional material consisting of a homogeneous mixture of bituminous binder and grass-like blades of a species of the Yucca plant.

5. Constructional material consisting of a homogeneous mixture of bituminous binder, a primary filling of a species of the Yucca plant, and a secondary filling medium.

6. An expansion joint consisting of a homogeneous mixture of bituminous binder, a primary filling of grass-like blades of a species of the Yucca plant, and a secondary filling medium.

Signed at Chicago, Illinois this 22nd day of January, 1926.

ALBERT C. FISCHER.